(12) United States Patent
Xiao et al.

(10) Patent No.: US 12,481,055 B2
(45) Date of Patent: Nov. 25, 2025

(54) STATIC HUMAN POSE ESTIMATION METHOD BASED ON CSI SIGNAL ANGLE OF ARRIVAL ESTIMATION

(71) Applicant: Nanjing University of Posts and Telecommunications, Jiangsu (CN)

(72) Inventors: Fu Xiao, Jiangsu (CN); Mingming Xu, Jiangsu (CN); Zhengxin Guo, Jiangsu (CN); Hai Hu, Jiangsu (CN); Linqing Gui, Jiangsu (CN); Biyun Sheng, Jiangsu (CN); Jian Zhou, Jiangsu (CN); Hui Cai, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 0 days.

(21) Appl. No.: 18/271,236

(22) PCT Filed: Oct. 13, 2022

(86) PCT No.: PCT/CN2022/125127
§ 371 (c)(1),
(2) Date: Jul. 7, 2023

(87) PCT Pub. No.: WO2023/213051
PCT Pub. Date: Nov. 9, 2023

(65) Prior Publication Data
US 2025/0155567 A1 May 15, 2025

(30) Foreign Application Priority Data
May 6, 2022 (CN) .......... 202210484261.X

(51) Int. Cl.
*G01S 13/89* (2006.01)
*G01S 5/02* (2010.01)
(Continued)

(52) U.S. Cl.
CPC ............ *G01S 13/89* (2013.01); *G01S 5/0252* (2013.01); *G01S 13/87* (2013.01); *G06T 7/70* (2017.01); *G06T 2207/30196* (2013.01)

(58) Field of Classification Search
CPC ........ G01S 13/89; G01S 5/0252; G01S 13/87; G01S 7/417; G01S 13/003; G06N 3/08
See application file for complete search history.

(56) References Cited

U.S. PATENT DOCUMENTS

| | | |
|---|---|---|
| 11,397,258 B2 * | 7/2022 | Zeng .................. G01S 7/415 |
| 2020/0191913 A1 * | 6/2020 | Zhang ................ G01S 7/412 |

(Continued)

FOREIGN PATENT DOCUMENTS

| | | |
|---|---|---|
| CN | 114219853 | 3/2022 |
| CN | 114581958 | 6/2022 |

OTHER PUBLICATIONS

Yili Ren, Zi Wang, Sheng Tan, Yingying Chen, and Jie Yang. 2021. Winect: 3D Human Pose Tracking for Free-form Activity Using Commodity WiFi. Proc. ACM Interact. Mob. Wearable Ubiquitous Technol. 5, 4, Article 176 (Dec. 2021), 29 pages. https://doi.org/10.1145/3494973 (Year: 2021) (cited in IDS).*

(Continued)

*Primary Examiner* — William Kelleher
*Assistant Examiner* — Juliana Cross
(74) *Attorney, Agent, or Firm* — JCIPRNET

(57) ABSTRACT

A static human pose estimation method based on channel state information (CSI) signal angle of arrival (AoA) estimation is disclosed. A signal angle of arrival in a sensing area is estimated from CSI and an image is constructed, and a human pose is estimated from the image using a teacher-student network. The method comprises the following specific steps: CSI signals in a sensing area are collected at different heights using a receive antenna column with a moving track. Two-dimensional AoA image features are constructed: CSI information is converted into one-dimensional AoA data by using a MUSIC algorithm, and the one-dimensional AoA data of different heights are combined into a two-dimensional AoA image, and an environmental denoise algorithm is designed. A teacher-student network model is constructed, and a student network based on the two-dimensional AoA image is supervised, wherein the student network model can independently estimate a human pose from CSI.

6 Claims, 7 Drawing Sheets

(51) Int. Cl.
    *G01S 13/87*    (2006.01)
    *G06T 7/70*    (2017.01)

(56) References Cited

U.S. PATENT DOCUMENTS

2021/0385623 A1* 12/2021 Wang .................... H04W 4/029
2021/0390723 A1  12/2021 Ye et al.

OTHER PUBLICATIONS

Yili Ren et al., "Winect: 3D Human Pose Tracking for Free-form Activity Using Commodity WiFi", Proc. ACM Interact. Mob. Wearable Ubiquitous Technol, vol. 5, Issue 4, Dec. 2021, pp. 1-29.
Mingmin Zhao et al., "Through-Wall Human Pose Estimation Using Radio Signals", 2018 IEEE/CVF Conference on Computer Vision and Pattern Recognition, Jun. 2018, pp. 7356-7365.
Haoxiang Chen, "Research on Indoor Localization Algorithm Using Wi-Fi Channel State Information", Thesis of Master Degree, South China University of Technology, Apr. 2019, Submit with English abstract, pp. 1-82.
"International Search Report (Form PCT/ISA/210) of PCT/CN2022/125127", mailed on Jan. 13, 2023, pp. 1-4.
"Written Opinion of the International Searching Authority (Form PCT/ISA/237) of PCT/CN2022/125127", mailed on Jan. 12, 2023, pp. 1-5.

* cited by examiner

STATIC HUMAN POSE ESTIMATION METHOD BASED ON CSI SIGNAL ANGLE OF ARRIVAL ESTIMATION

FIELD OF THE INVENTION

The present invention relates to the technical field of human pose estimation, in particular to a static human pose estimation method based on CSI signal angle of arrival estimation.

DESCRIPTION OF RELATED ART

With the rapid development of human-oriented computer application technology, applications for human activities, such as smart home, motion sensing games, health estimation, activity recording, etc. are in urgent need of easy-to-use human pose estimation technology. Traditional human pose estimation technologies often require users to wear sensors or to deploy cameras, which increase the cost of use and potentially violating privacy. Emerging indoor wireless sensing technology uses wireless electromagnetic signals to sense human activities, which reduces the need of wearing additional sensors, and the deployment complexity. Human pose estimation technology can be further divided into single pose classification and pose estimation based on human skeleton keypoints. Single pose classification can only predict a few fixed poses, while pose estimation based on human skeleton keypoints outputs the position and association of human skeleton keypoints.

At present, human pose estimation technologies mainly use visual methods, RF signals, millimeter wave radar, etc. However, these techniques often require users to purchase additional hardware and have poor sensing accuracy. The vision-based human pose estimation method has been widely used, where images taken during human activities are analyzed and machine learning algorithms are used to predict the poses or positions of skeleton keypoints of a person in the images. However, with the improvement of people's privacy awareness, the visual method, which requires the use of cameras that may cause privacy leakage, has been resisted. The RF signal-based human pose estimation method can realize human pose estimation by using modulated electromagnetic waves to scan the area where an object is located and analyzing signal changes in the sensing area; however, this solution is limited by the need for expensive custom devices and the need for professionals to deploy the devices. The millimeter wave radar-based human pose estimation method uses a millimeter wave device to transmit signal beams and receive echoes to analyze human activity states in a sensing area to estimate human poses, and can estimate 3D human skeleton keypoints and activity trajectories of a person; however, the device used is expensive, and has a high signal transmission power that may affect human health in the living environment, so that it is difficult to widely deploy.

SUMMARY OF THE INVENTION

An object of the present invention is to provide a static human pose estimation method based on CSI signal angle of arrival estimation, which receives CSI data in a sensing area through widely deployed Wi-Fi devices, estimates a signal angle of arrival in the sensing area, constructs a two-dimensional angle of arrival image, and estimates a human pose from the two-dimensional angle of arrival image using a teacher-student network, with high prediction accuracy and low usage cost.

A static human pose estimation method based on CSI signal angle of arrival estimation, comprising the following steps:

Step 1: placing a receive antenna column with a moving track in a sensing area, using a fixed transmit antenna to send CSI data packets to the receive antenna mounted on the moving track, and moving the receive antenna to multiple specified heights to collect CSI data and synchronously collect image data;

Step 2: extracting phase information in the CSI data, constructing eight one-dimensional AoA image, and combining the eight one-dimensional AoA images of different heights into a two-dimensional AoA image;

Step 3: reducing environmental interference factors in the two-dimensional AoA image by using an environmental denoise algorithm;

Step 4: inputting the image data into a teacher network to obtain supervised data of coordinates of human skeleton keypoints, and inputting the supervised data and the denoised two-dimensional AoA image into a student network for training;

Step 5: upon predicting a human pose, placing a receive antenna column with a moving track in a sensing area, using a fixed transmit antenna to send Wi-Fi data packets to the receive antenna mounted on the moving track, moving the receive antenna to multiple specified heights, collecting one piece of CSI data at each height, and after extracting features through steps 2 and 3 from the CSI data collected at different heights and interpolating the features, inputting them into the student network model trained in step 4, to output predicted coordinates of the human skeleton keypoints of an object in the sensing area.

Further, in step 2, for the phase data $\phi_{i,k}$ of the k-th subcarrier of the i-th receive antenna in a single CSI data packet collected at one height, the phase error model thereof is expressed as:

$$\phi_{i,k} = \theta_k + \varphi_k - 2\pi \cdot k \cdot f_s \cdot \delta + \beta + Z$$

in which $\theta_k$ is the raw phase, $\varphi_k$ is the nonlinear error, $f_s$ is the frequency space between subcarriers, $\delta$ is the propagation delay caused by multipath propagation, $\beta$ is the linear phase error, and Z is Gaussian white noise; the transmit and receive antennas are directly connected through a cable to obtain a phase without environmental interference $\phi_k'$, and a nonlinear phase error $\varphi_k$ and a linear phase error $\beta$, as well as the synchronization phase error $\Delta\varphi$ between the receive antennas, are solved using linear fitting.

Further, in step 2, the phase data of 56 subcarriers contained in the CSI data are extracted, and the phase data of three receive antennas are synchronized and error corrected; when the receive antenna moves to a height i, a MUSIC spectrum $P_{MUSIC}(\tau, \theta)$ for joint estimation of ToF and AoA is calculated from the collected CSI signal by using a MUSIC algorithm, in which $\tau$ is the time of flight (ToF), $\theta$ is the angle of arrival (AoA); the MUSIC spectrum $P_{MUSIC}(\tau, \theta)$ is converted into a one-dimensional AoA image containing 1×181 pixels, and the k-th pixel is calculated as:

$$1D\ img_i(1, k) = \sum_{\tau} P_i(\tau, k)$$

CSI data are collected respectively at 8 different heights and converted into a one-dimensional AoA image, and eight one-dimensional AoA images are combined into a complete two-dimensional AoA image:

$$2D\ AoA\ \text{image} = (img_1\ img_2\ \ldots\ img_8)^T$$

Further, in step 3, the specific method of the environment denoise algorithm is as follows:

Step 3-1: performing statistics and analysis of $P_{MUSIC}$ of 1500 data packets collected at a sampling point A for 15 s in static environment, and using the cumulative distribution function to analyze the time range and distribution of the corresponding $ToF_{static}$;

$$F_{ToF_{static}}(x) = P(ToF_{static} \leq x)$$

according to the actual situation of ToF distribution, dividing ToF into several segments: the distribution interval of ToF is $[X_{min}, X_{max}]$, which, according to the value of ToF, is divided into L ToF segments of unequal length, and for the k-th ToF segment $[x_{kl}, x_{kr}]$, the distribution thereof is $P(x_{kl} \leq ToF \leq x_{kr})$;

Step 3-2: calculating a weighting matrix weight ($ToF_{static}$) using an exponential weighting function according to the interval ToF segment and distribution: for the interval inter= $[x_{kl}, x_{kr}]$:

$$\text{weight}(ToF_{static}) = \beta \times \alpha^{P(x_{kl} \leq ToF_{static} \leq x_{kr})}$$

in which β is a parameter determined by the length of ToF, and α is the attenuation factor, which is set according to the intensity of the environmental factors that need to be reduced;

Step 3-3: after collecting the $P_{MUSIC}$ of a single packet at the sampling point A in dynamic environment, analyzing the time of flight $ToF_{dynamic}$ of $P_{MUSIC}$ in the single packet in dynamic environment, and using the weighting function weight( ) obtained in step 3-2 to calculate a $P'_{Music}$ after the environmental denoise:

$$P_{MUSIC}(ToF_{dynamic}, AoA)' = P_{MUSIC}(ToF_{dynamic}, AoA) \times \text{weight}(ToF_{dynamic})$$

Further, in step 4, the designed neural network comprises a teacher network and a student network comprising an input layer, a residual block and an output layer; the input of the teacher network is an image, and the output thereof is coordinates of human skeleton keypoints; the input of the student network is a two-dimensional AoA image of size 32×181, the input layer uses a convolution kernel with a step size of 2 and a size of 7×7 and the number of channels is increased to 64; four residual blocks are used, each residual block contains 2 residual layers, the first residual layer of the residual block uses a convolution kernel with a step size of 2 and a size of 3×3, and the second residual layer has the same structure as the first residual layer, with a step size of 1; the output layer uses a flatten layer to one-dimensionalize the data and then inputs them into a fully connected layer, and finally outputs the predicted coordinates of human skeleton keypoints.

Further, in step 4, for the obtained 2D AoA image $\in R^{8 \times 181}$, Fourier interpolation is used to interpolate the data into 2D AoA image' $\in R^{32 \times 181}$.

The beneficial effects achieved by the present invention are as follows: a human pose estimation method based on CSI signal angle of arrival estimation is proposed, where CSI data is collected through commercial Wi-Fi devices, a signal angle of arrival in a sensing area is estimated, a two-dimensional angle of arrival image is constructed, and a static human pose is estimated from the two-dimensional angle of arrival image using a teacher-student network. The method has the advantages of non-contact sensing, high estimation accuracy, and low cost.

DETAILED DESCRIPTION OF THE INVENTION

The technical solutions of the present invention are further elaborated below with reference to the drawings of the description.

Figure 1:
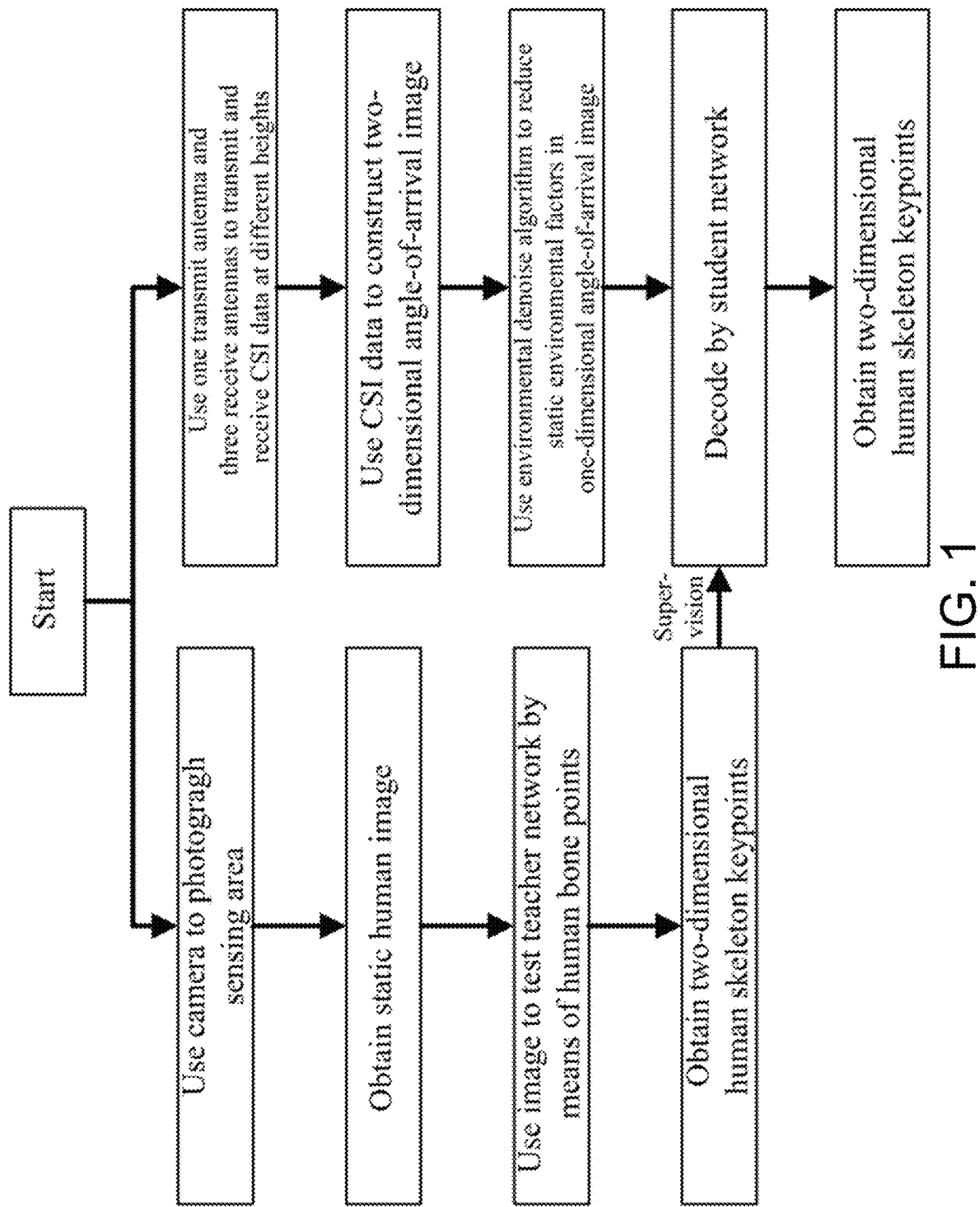
FIG. 1 is a schematic flowchart of a human pose estimation method based on CSI signal angle of arrival estimation in an embodiment of the present invention.
Figure 2:
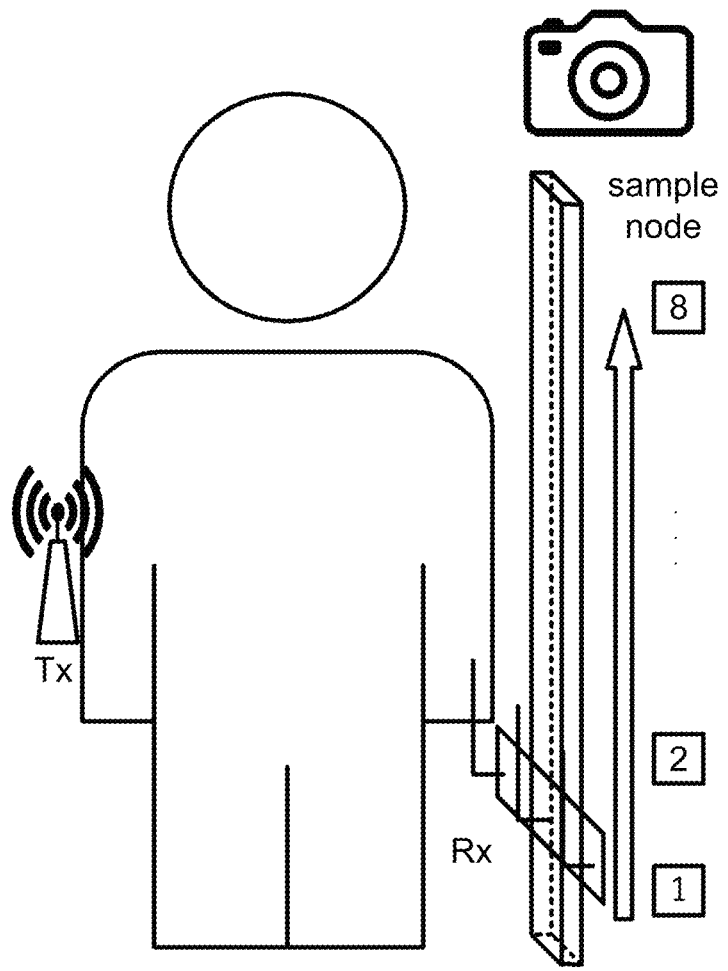
FIG. 2 is a schematic diagram of an experimental scenario in an embodiment of the present invention.

As shown in FIG. 1, the present invention provides a static human pose estimation method based on CSI signal angle of arrival estimation, the process of which is as follows:

Step 1: as shown in FIG. 2, placing a receive antenna column with a moving track in a sensing area, using a fixed transmit antenna to send Wi-Fi data packets to the receive antenna on the moving track, and moving the receive antenna to multiple specified heights to collect CSI data and synchronously collect image data.

Step 2: collecting 3000 CSI data packets respectively at eight different heights, extracting phase information in the CSI data, constructing eight one-dimensional AoA images, and combining the eight one-dimensional AoA images of different heights into a two-dimensional AoA image.

Specifically, for the phase data $\varphi_{i,k}$ of the k-th subcarrier of the i-th receive antenna in a single CSI data packet collected at one height, the phase error model thereof may be expressed as:

$$\phi_{i,k} = \theta_k + \varphi_k - 2\pi \cdot k \cdot f_s \cdot \delta + \Omega + Z$$

in which $\theta_k$ is the raw phase, $\varphi_k$ is the nonlinear error, $f_s$ is the frequency space between subcarriers, δ is the propagation delay caused by multipath propagation, $\Omega$ is the linear phase error, and Z is Gaussian white noise.

The transmit and receive antennas are directly connected through a cable to obtain a phase without environmental interference $\phi_k'$, and a nonlinear phase error $\phi_k$ and a linear phase error $\Omega$, as well as the synchronization phase error $\Delta_\phi$ between the received antennas, are solved using linear fitting.

For the CSI phases of three antennas ($\phi_{1,1-56}$, $\phi_{2,1-56}$, $\phi_{3,1-56}$), when the receive antenna moves to a height i, a MUSIC spectrum $P_{MUSIC}(\tau, \theta)$ for joint estimation of ToF and AoA is calculated from the collected CSI signals by using a MUSIC algorithm, in which $\tau$ is the time of flight, and $\theta$ is the angle of arrival. The MUSIC spectrum $P_{MUSIC}(\tau, \theta)$ is converted into a one-dimensional AoA image containing 1×181 pixels, and the k-th pixel is calculated as:

$$1D\ img_i(1, k) = \sum_\tau P_i(\tau, k)$$

The k in the equation here is the angle in the spectrum, and each pixel of the one-dimensional AoA image corresponds to 1 degree in angle, and there are 181 pixels because 0 degree is included.

CSI data are collected respectively at 8 different heights and converted into a one-dimensional AoA image, and eight one-dimensional AoA images are combined into a complete two-dimensional AoA image:

$$2D\ AoA\ image = (img_1\ img_2\ \ldots\ img_8)^T$$

Step 3: reducing environmental interference factors in the two-dimensional AoA image by using an environmental denoise algorithm:

Step 3-1: performing statistics and analysis of $P_{MUSIC}$ of 1500 data packets collected at a sampling point A for 15 s in static environment, and using the cumulative distribution function to analyze the time range and distribution of the corresponding $ToF_{static}$:

$$F_{ToF_{static}}(x) = P(ToF_{static} \leq x)$$

according to the actual situation of ToF distribution, dividing ToF into several segments: the distribution interval of ToF is $[X_{min}, X_{max}]$, which, according to the value of ToF, is divided into L ToF segments of unequal length, and for the k-th ToF segment $[x_{kl}, x_{kr}]$, the distribution thereof is $P(x_{kl} \leq ToF \leq x_{kr})$.

Step 3-2: calculating a weighting matrix weight ($ToF_{static}$) using an exponential weighting function according to the interval ToF segment and distribution: for the interval inter= $[x_{kl}, x_{kr}]$:

$$weight(ToF_{static}) = \beta \times \alpha^{P(x_{kl} \leq ToF_{static} \leq x_{kr})}$$

in which $\beta$ is a parameter determined by the length of ToF, and $\alpha$ is the attenuation factor, which is set according to the intensity of the environmental factors that need to be reduced.

Step 3-3: after collecting the $P_{MUSIC}$ of a single packet at the sampling point A in dynamic environment, analyzing the time of flight $ToF_{dynamic}$ of $P_{MUSIC}$ in the single packet in dynamic environment, and using the weighting function weight( ) obtained in step 3-2 to calculate a $P'_{MUSIC}$ after the environmental denoise:

$$P_{MUSIC}(ToF_{dynamic}, AoA)' = P_{MUSIC}(ToF_{dynamic}, AoA) \times weight(ToF_{dynamic})$$

Step 4: inputting the image data into a teacher network to obtain supervised data of coordinates of human skeleton keypoints, and inputting the supervised data and the AoA image after denoise into a student network for training.

Figure 3:
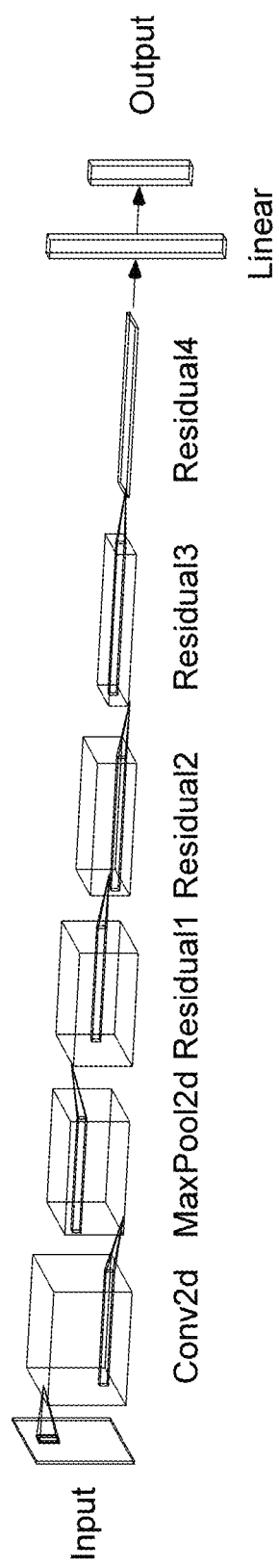
FIG. 3 is a schematic diagram of a network structure of a student network in an embodiment of the present invention.

The designed neural network includes a teacher network and a student network including an input layer, a residual block and an output layer. The input of the teacher network is an image, and the output thereof is coordinates of human skeleton keypoints. As shown in FIG. 3, the input of the student network is a two-dimensional AoA image of size 32×181, the input layer uses a convolution kernel with a step size of 2 and a size of 7×7 and the number of channels is increased to 64; four residual blocks are used, each residual block contains 2 residual layers, and the first residual layer of the residual block uses a convolution kernel with a step size of 2 and a size of 3×3, and the second residual layer has the same structure as the first residual layer but with a step size of 1; the output layer uses a flatten layer to one-dimensionalize the data and then inputs them into a fully connected layer, and finally outputs predicted coordinates of human skeleton keypoints.

Step 5: upon predicting a human pose, placing a receive antenna column with a moving track in a sensing area, using a fixed transmit antenna to send CSI data packets to the receive antenna mounted on the moving track, moving the receive antenna to multiple specified heights, collecting one piece of CSI data at each height, and after extracting features through steps 2 and 3 from the CSI data collected at different heights, interpolating the features:

for the obtained 2D AoA image $\in R^{8 \times 181}$, using Fourier interpolation to interpolate the data into 2D AoA image' $\in R^{32 \times 181}$;

and inputting 2D AoA image into the student network model trained in step 4 to output the predicted coordinates of human skeleton keypoints of an object in the sensing area.

The process in steps 1-4 corresponds to the training phase in machine learning. During training, a large amount of data needs to be collected at each height to train the student network. The collection lasts 30 s at each height, and it takes 5 min for collection at 8 heights. Step 5 is for human pose estimation. For the testing stage in machine learning, only one piece of data needs to be collected for each height during the test. The collection of one piece of data only takes 10 milliseconds. Including the moving time on the slide rail, the data collection of 8 heights can be done within 10 s. In actual use, using the trained student network model for pose prediction requires less data collection time. If a radio frequency switch is used, this process can be reduced to within 1 s.

In order to evaluate the reliability of the present method at different time points and in different scenarios, experiments were carried out in the following three experimental scenarios: 1. Laboratory A: irregular in shape, with some experimental instruments stacked near the wall; 2. Laboratory B: rectangular, with multiple desks and iron filing cabinets against the wall; 3. Corridor: long and narrow with a window on one side.

In order to evaluate the influence of different body heights and sizes on the present method, 6 volunteers with different genders, heights and sizes were selected. The data set contains 5 actions collected of 6 volunteers in 3 environments: standing, hands on hips, raising hands horizontally, hands up, and sitting, respectively. Each action contains 8 sampling points, and 1500 CSI samples are collected for each sampling point. A total of 1080000 CSI samples were collected, and 135000 2D AoA images were generated. At the same time, we used a camera to collect pictures of each action of each volunteer, and used OpenPose to obtain labels of human skeleton keypoints. 75% of the data was used to train the network and the remaining 25% was used to test the network.

Figure 4:
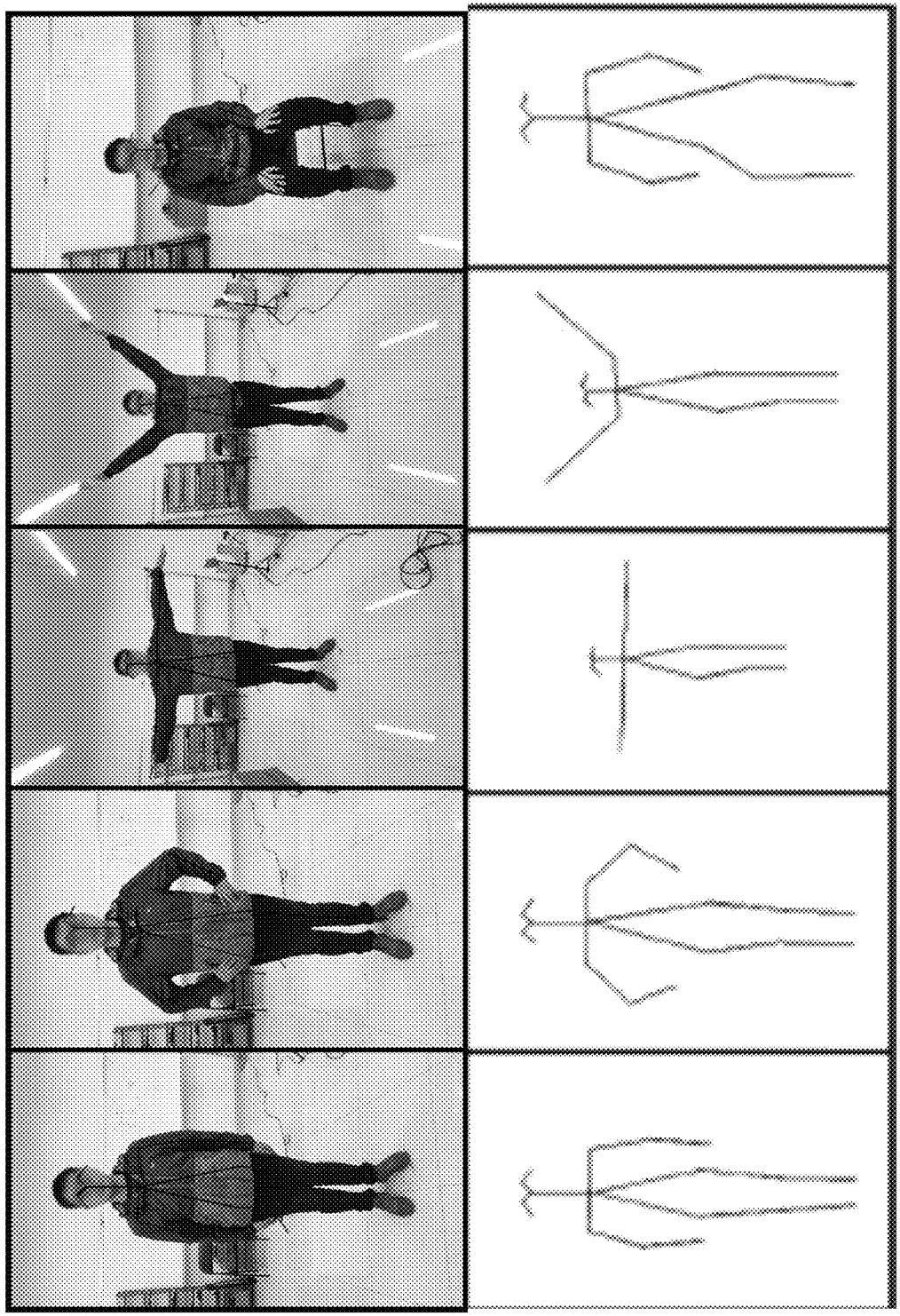
FIG. 4 is a schematic diagram of prediction results of human pose estimation in an embodiment of the present invention.

FIG. 4 shows the skeleton point results of the present method in Lab B for estimating 5 different poses of a static human body: the first row of images are collected pictures of 5 different poses of the object and human keypoints predicted by OpenPose; the second row of images are the prediction results of collected keypoints for 5 different poses of the object by the present method. The prediction results show that the present method can accurately estimate different poses of the human body, and the prediction results are not much different from those obtained by the vision-based method OpenPose.

In order to better evaluate the gap between the human skeleton keypoints predicted by the present method and the annotation outputted by OpenPose, Percentage of Correct Keypoint (PCK) is used:

$$PCK_i @ a = \frac{1}{N} \sum_{i=1}^{N} L\left(\frac{\|pd_i - gt_i\|_2^2}{\text{length}_{std}} \leq a\right)$$

in which L is a logic function, outputting 1 when the expression is true, and outputting 0 when the expression is false; N is the number of samples tested, and i refers to the i-th key point of the human body, i ∈ COCO18 or Body10; $pd_i$ is the predicted keypoint, $gt_i$ is ground-truth, $\|pd_i - gt_i\|_2^2$, is the Euclidean distance between the predicted value and the true value of the key point i; $\text{length}_{std}$ is a parameter used to standardize the error, and a is the size of a range that allows the predicted value to be around the true value.

1. Overall Prediction Rate

Since different volunteers have different heights and sizes, the volunteer's head length hl is used as a standardized parameter. In the case of COCO18, as calculated by PCK@0.5 hl, the average key point prediction rate of the present method in three different scenarios is 85.5% (A: 88.4%, B: 91.8%, C: 76.3%); in the case of Body10, as calculated by PCK@0.5 hl, the average key point prediction rate of the present method in three different scenarios is 83.5% (A: 85.4%, B: 91.8%, C: 73.4%). Compared with Wi-Pose and WiSPPN, the accuracy of the present method is significantly increased, and a prediction rate improvement of 18% can be achieved when the PCK indicator is set lower (PCK@40, $\text{length}_{std}=1$); when the PCK indicator is set higher (PCK@25, $\text{length}_{std}=1$), both Wi-Pose and WiSPPN fail to predict, while the present method can still achieve a prediction rate of 85%.

TABLE 1

| | Skeleton point prediction rate | | | | | | |
|---|---|---|---|---|---|---|---|
| | Head length | | Pixel | | | | |
| PCK | 0.3 | 0.5 | 10 | 25 | 30 | 40 | 50 |
| The present patent | 77.2 | 85.5 | 73.1 | 88.0% | 90.3% | 93.4% | 95.2% |
| Wi-Pose | ~ | ~ | ~ | 2.5% | 26.2% | 75.6% | 90.9% |
| WiSPPN | 4% | 2 | 14% | 38% | 59% | 73% | 82% |

2. Prediction Accuracy of Different Skeleton Keypoints

Figure 5:
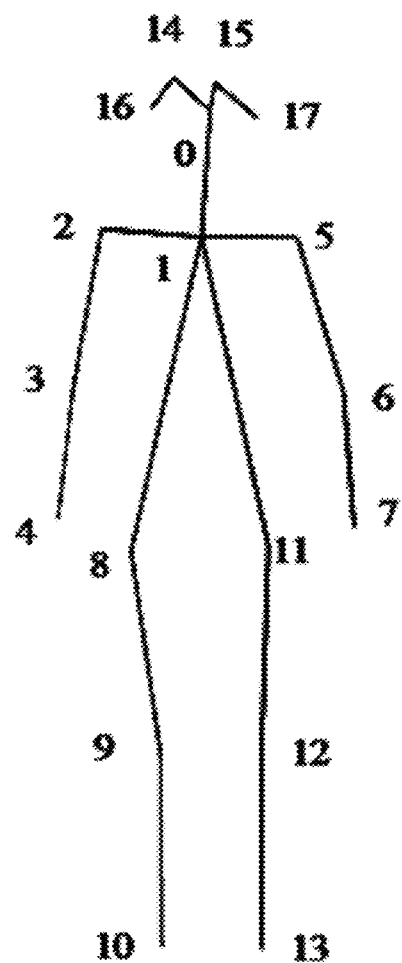
FIG. 5 is a schematic diagram of skeleton keypoints of COCO18 in an embodiment of the present invention.
Figure 6:
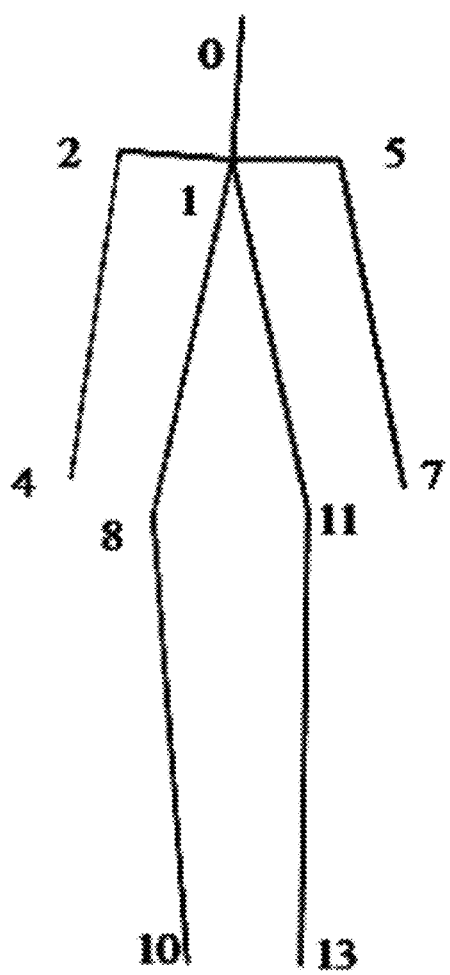
FIG. 6 is a schematic diagram of two skeleton keypoints of COCO18 and Body10 in an embodiment of the present invention.

Human skeleton keypoints are distributed in different parts of a human body, and the reflection characteristics of wireless signals at different key points differ as well. Therefore, the prediction accuracy of each keypoint is different. Table 2 gives two representation standards for skeleton keypoints, COCO18 and Body10, see FIGS. 5-6. Tables 3 and 4 give the average prediction accuracy of each keypoint under COCO18 PCK@25 and Body10 PCK@25. The results show that the average prediction accuracy of all skeleton keypoints is 88% in both COCO18 and Body10. The prediction accuracy of the left and right wrists in the same environment is lower than that of other keypoints, which is 79% in COCO18 and 80% in Body10. Presumably this is because the wrists sometimes move away from the torso, making prediction more difficult.

TABLE 2

| List of skeleton keypoints of COCO18 and Body10 | | | |
|---|---|---|---|
| COCO18 Node Index | | Body10 Node Index | |
| 0: 'Nose' | 9: 'RKnee' | 0: 'Nose' | 7: 'LWrist' |
| 1: 'Neck' | 10: 'RAnkle' | 1: 'Neck' | 8: 'RHip' |
| 2: 'RShoulder' | 11: 'LHip' | 2: 'RShoulder' | 10: 'RAnkle' |
| 3: 'RElbow' | 12: 'Lknee' | 4: 'RWrist' | 11: 'LHip' |
| 4: 'RWrist' | 13: 'LAnkle' | 5: 'LShoulder' | 13: 'LAnkle' |
| 5: 'LShoulder' | 14: 'REye' | | |
| 6: 'LElbow' | 15: 'Leye' | | |
| 7: 'LWrist' | 16: 'REar' | | |
| 8: 'RHip' | 17: 'LEar' | | |

TABLE 3

Average prediction accuracy (percentage) of skeleton keypoints under COCO18 PCK@25

| Environment | Nose | Neck | RShoulder | RElbow | RWrist | LShoulder | LElbow | LWrist | RHip |
|---|---|---|---|---|---|---|---|---|---|
| Lab A | 88.3 | 90.9 | 90.7 | 86.8 | 82.8 | 90.3 | 87.2 | 83.4 | 95.7 |
| Lab B | 91.8 | 93.5 | 93 | 92.4 | 90 | 93.5 | 92.4 | 89.6 | 96.2 |
| Corridor | 82 | 86.3 | 86.3 | 74.5 | 66.6 | 85.5 | 72.5 | 63.9 | 90.6 |
| Average | 87.4 | 90.3 | 90 | 84.6 | 79.8 | 89.8 | 84 | 79 | 94.1 |

| Scenario | RKnee | RAnkle | LHip | LKnee | LAnkle | REye | LEye | REar | LEar |
|---|---|---|---|---|---|---|---|---|---|
| Lab A | 92.5 | 90.6 | 95.3 | 91 | 89.7 | 88.1 | 88.1 | 88.6 | 88.6 |
| Lab B | 92.9 | 92 | 96.5 | 93.7 | 92.1 | 91.8 | 91.9 | 91.8 | 91.9 |
| Corridor | 86.3 | 85 | 90.3 | 88.5 | 88.4 | 82.1 | 82.1 | 82.9 | 83 |
| Average | 90.6 | 89.2 | 94 | 91 | 90 | 87.3 | 87.3 | 87.8 | 87.9 |

TABLE 4

Average prediction accuracy (percentage) of skeleton keypoints under Body10 PCK@25

| Environment | Nose | Neck | RShoulder | RWrist | LShoulder | LWrist | RHip | RAnkle | LHip | LAnkle |
|---|---|---|---|---|---|---|---|---|---|---|
| Lab A | 87.7 | 90.4 | 90.1 | 81.7 | 89.6 | 82.4 | 95.9 | 92.2 | 89.8 | 90.7 |
| Lab B | 93.5 | 95.2 | 94.8 | 90.9 | 95.2 | 90.7 | 97.4 | 94.7 | 93.8 | 95.6 |
| Corridor | 81.6 | 87 | 86.4 | 68 | 86.3 | 69 | 91.9 | 87.6 | 86.6 | 89.7 |
| Average | 87.6 | 90.9 | 90.4 | 80.2 | 90.4 | 80.7 | 95.1 | 91.5 | 90 | 92 |

3. Effect of Environmental Denoise Algorithm on Prediction Accuracy

Figure 7:
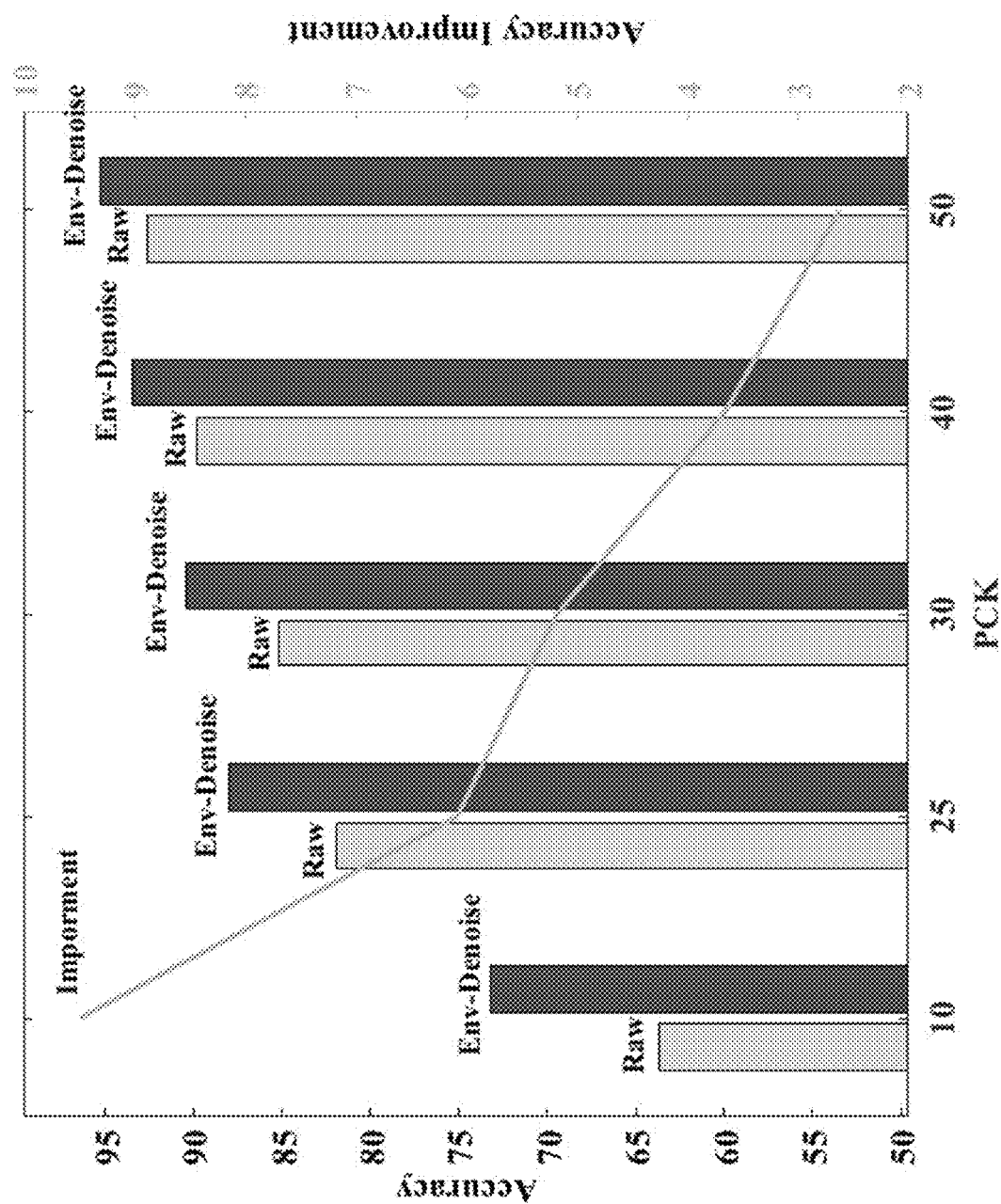
FIG. 7 is a schematic diagram of the effect of the environmental denoise algorithm on the prediction accuracy of skeleton keypoints in an embodiment of the present invention.

The present method uses an environmental denoise algorithm to reduce the influence of environmental factors. FIG. 7 shows the prediction accuracy of the evaluation data using the environmental denoise algorithm and the prediction accuracy of the raw data in the present method, respectively. The results show that the environmental denoise algorithm improves the prediction accuracy by 5% in all environments. When the PCK indicator is increased from PCK@50 to PCK@10, the improvement by the environmental denoise algorithm is increased from 2.6% to 9.5%. In addition, for the complex environment of the corridor, the data with the environmental denoise algorithm has a 7% improvement at PCK@25.

The above description are only preferred embodiments of the present invention, and the scope of protection of the present invention is not limited to the above embodiments. Any equivalent modifications or variations made by those of ordinary skill in the art based on the disclosure of the present invention should be included within the scope of protection described in the claims.

What is claimed is:

1. A static human pose estimation method based on CSI signal angle of arrival estimation, the human pose estimation method comprising the following steps:
   Step 1: placing a receive antenna column with a moving track in a sensing area, using a fixed transmit antenna to send Wi-Fi data packets to the receive antenna mounted on the moving track, and moving the receive antenna to multiple specified heights to collect multiple CSI data at the respective heights and synchronously collect image data;
   Step 2: extracting phase information in the CSI data, constructing eight one-dimensional angle of arrival (AoA) image, and combining the eight one-dimensional AoA images of different heights into a two-dimensional AoA image;
   Step 3: reducing environmental interference factors in the two-dimensional AoA image by using an environmental denoise algorithm;
   Step 4: inputting the image data into a teacher network to obtain supervised data of coordinates of human skeleton keypoints, and inputting the supervised data and the two-dimensional AoA image after denoise into a student network for training;
   Step 5: upon predicting a human pose, placing a receive antenna column with a moving track in a sensing area, using a fixed transmit antenna to send Wi-Fi data packets to the receive antenna mounted on the moving track, moving the receive antenna to multiple specified heights, collecting one piece of CSI data at each height, and after extracting features through steps 2 and 3 from the CSI data collected at different heights and interpolating the features, inputting them into the student network model trained in step 4, to output predicted coordinates of the human skeleton keypoints of an object in the sensing area.

2. The static human pose estimation method based on CSI signal angle of arrival estimation according to claim 1, wherein in step 2, for the phase data $\phi_{i,k}$ of the k-th subcarrier of the i-th receive antenna in a single CSI data packet collected at one height, the phase error model thereof is expressed as:

$$\phi_{i,k} = \theta_k + \varphi_k - 2\pi \cdot k \cdot f_s \cdot \delta + \Omega + Z$$

in which $\theta_k$ is the raw phase, $\varphi_k$ is the nonlinear error, $f_s$ is the frequency space between subcarriers, $\delta$ is the propagation delay caused by multipath propagation, $\Omega$ is the linear phase error, and Z is Gaussian white noise; the transmit and receive antennas are directly connected through a cable to obtain a phase without environmental interference $\varphi_k'$, and a nonlinear phase error $\varphi_k$ and a linear phase error Ω, as well as the synchronization phase error Δφ between the receive antennas, are solved using linear fitting.

3. The static human pose estimation method based on CSI signal angle of arrival estimation according to claim 1, wherein in step 2, the phase data of 56 subcarriers contained in the CSI data are extracted, and the phase data of three receive antennas are synchronized and error corrected; when the receive antenna moves to a height i, a MUSIC spectrum $P_{MUSIC}(\tau, \theta)$ for joint estimation of time of flight (ToF) and AoA is calculated from the collected CSI signal by using a MUSIC algorithm, in which t is the ToF, θ is the AoA; the MUSIC spectrum $P_{MUSIC}(\tau, \theta)$ is converted into a one-dimensional AoA image containing 1×181 pixels, and the k-th pixel of the one-dimensional AoA image of height i is calculated as:

$$1D\ img_i(1, k) = \sum_\tau P_i(\tau, k)$$

CSI data are collected respectively at 8 different heights and converted into a one-dimensional AoA image, and eight one-dimensional AoA images are combined into a complete two-dimensional AoA image:

$$2D\ AoA\ image = (img_1\ img_2\ \ldots\ img_8)^T.$$

4. The static human post estimation method based on CSI signal angle of arrival estimation according to claim 1, characterized in that, wherein in step 3, the specific method of the environmental denoise algorithm is as follows:

Step 3-1: performing statistics and analysis of $P_{MUSIC}$ of 1500 data packets collected at a sampling point A for 15 s in static environment, and using the cumulative distribution function to analyze the time range and distribution of the time of flight in static environment $ToF_{static}$:

$$F_{ToF_{static}}(x) = P(ToF_{static} \leq x)$$

according to the actual situation of ToF distribution, dividing ToF into several segments: the distribution interval of ToF is $[X_{min}, X_{max}]$, which, according to the value of ToF, is divided into L ToF segments of unequal length, and for the k-th ToF segment $[x_{kl}, x_{kr}]$, the distribution thereof is $P(x_{kl} \leq ToF \leq x_{kr})$;

Step 3-2: calculating a weighting matrix weight $(ToF_{static})$ using an exponential weighting function according to the interval ToF segment and distribution: for the interval inter=$[x_{kl}, x_{kr}]$:

$$\text{weight}(ToF_{static}) = \beta \times \alpha^{P(x_{kl} \leq ToF_{static} \leq x_{kr})}$$

in which β is a parameter determined by the length of ToF, and a is the attenuation factor, which is set according to the intensity of the environmental factors that need to be reduced;

Step 3-3: after collecting the $P_{MUSIC}$ of a single packet at the sampling point A in dynamic environment, analyzing the time of flight $ToF_{dynamic}$ of $P_{MUSIC}$ of the single packet in dynamic environment, and using the weighting function weight ( ) obtained in step 3-2 to calculate a $P_{MUSIC}$ after the environmental denoise:

$$P_{MUSIC}(ToF_{dynamic}, AoA)' = P_{MUSIC}(ToF_{dynamic}, AoA) \times \text{weight}(ToF_{dynamic}).$$

5. The static human post estimation method based on CSI signal angle of arrival estimation according to claim 1, wherein in step 4, the designed neural network comprises a teacher network and a student network comprising an input layer, a residual block and an output layer; the input of the teacher network is an image, and the output thereof is coordinates of human skeleton keypoints; the input of the student network is a two-dimensional AoA image of size 32×181, the input layer uses a convolution kernel with a step size of 2 and a size of 7×7 and the number of channels is increased to 64; the residual block contains 2 residual layers, the first residual layer of the residual block uses a convolution kernel with a step size of 2 and a size of 3×3, and the second residual layer has the same structure as the first residual layer, with a step size of 1; the output layer uses a flatten layer to one-dimensionalize the data and then inputs them into a fully connected layer, and finally outputs the predicted coordinates of human skeleton keypoints.

6. The static human post estimation method based on CSI signal angle of arrival estimation according to claim 1, wherein in step 4, for the obtained 2D AoA image $\in R^{8 \times 181}$, Fourier interpolation is used to interpolate the data into 2D AoA image' $\in R^{32 \times 181}$.

* * * * *